June 24, 1969  J. R. BORDEN ET AL  3,452,266
D.C.-TO-D.C. CONVERTER
Filed Feb. 8, 1967  Sheet 1 of 2
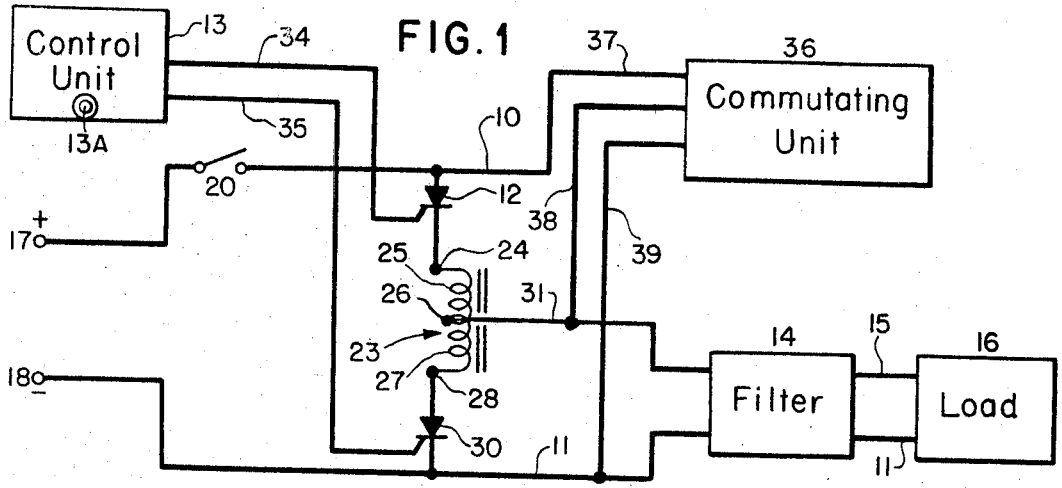
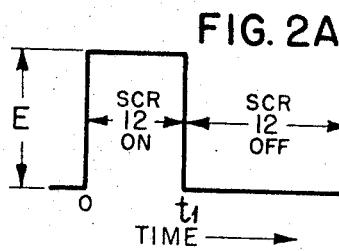
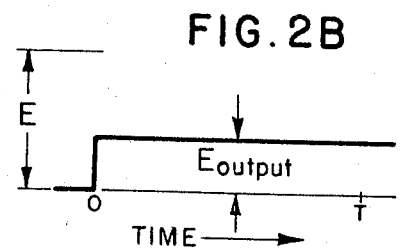
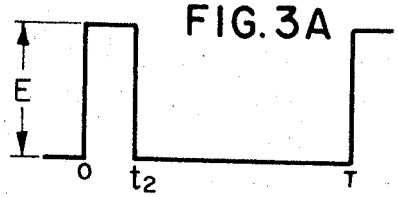
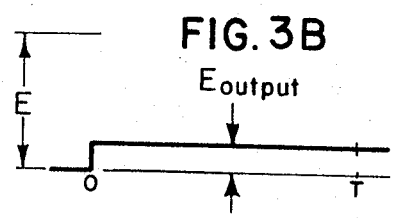
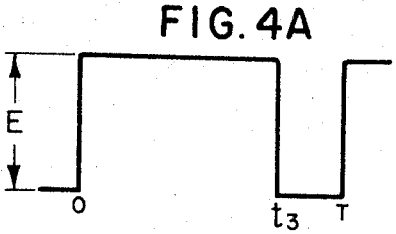
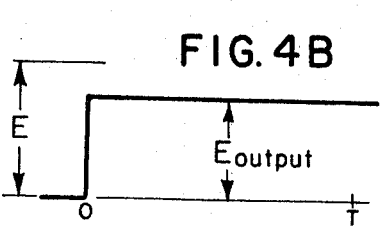
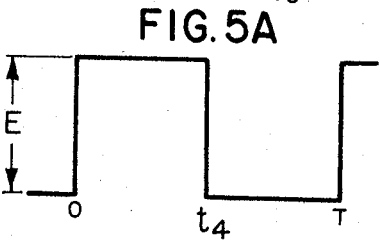
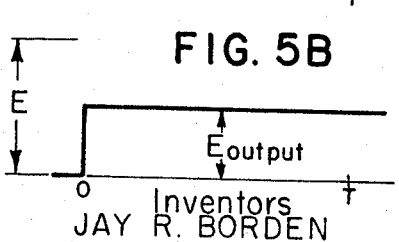
Inventors
JAY R. BORDEN
LUCIEN J. BOUTIN
EVERETT R. GEIS
STANLEY KRAUTHAMER
By James J. Jennings, Jr.
ATTORNEY

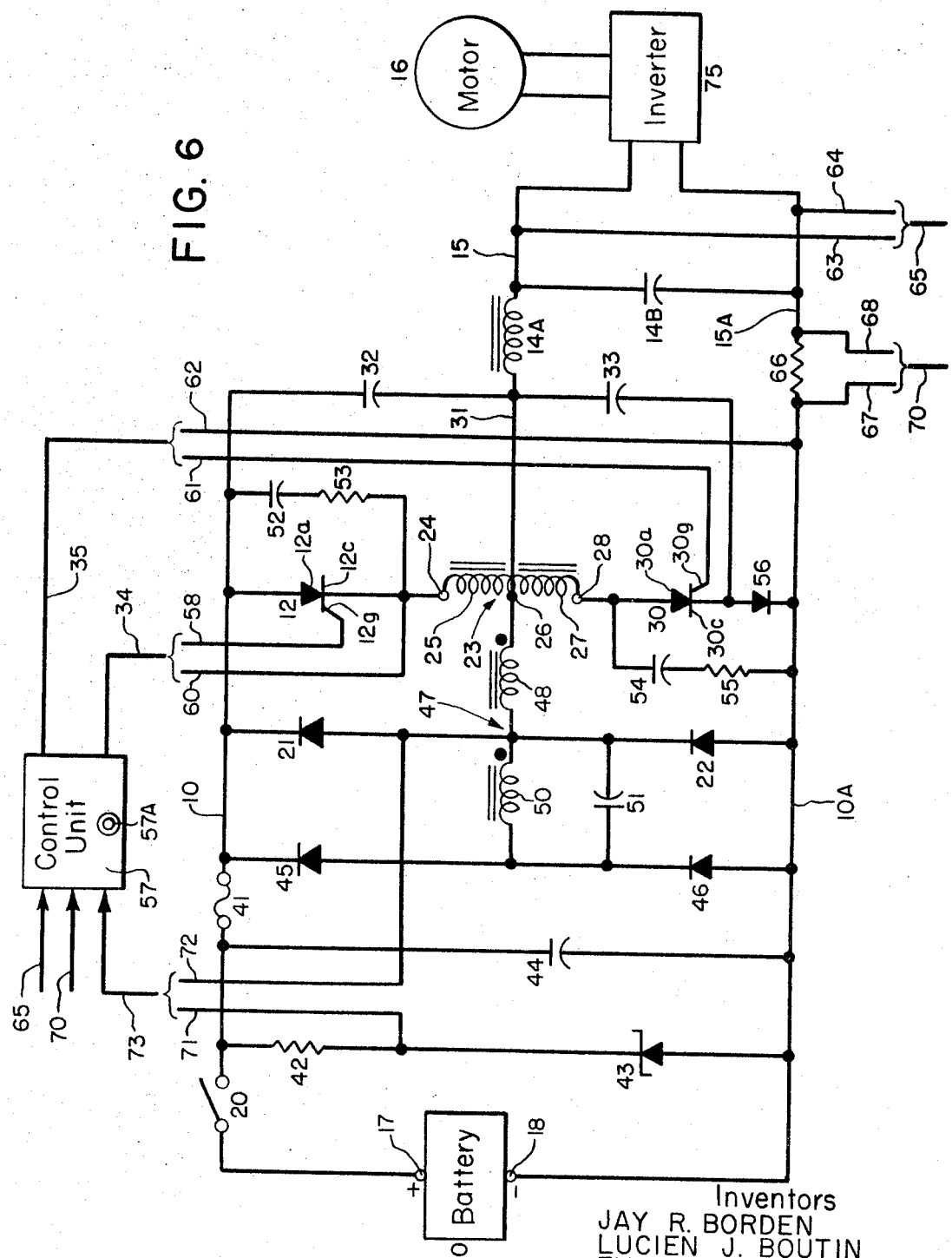

United States Patent Office 3,452,266
Patented June 24, 1969

3,452,266
D.C.-TO-D.C. CONVERTER
Jay R. Borden, Santa Ana, Calif., Lucien J. Boutin, Alexandria, Va., and Everett R. Geis, Orange, and Stanley Krauthamer, Monterey Park, Calif., assignors to Borg-Warner Corporation, Chicago, Ill., a corporation of Illinois
Filed Feb. 8, 1967, Ser. No. 614,649
Int. Cl. H02m 1/08, 7/00
U.S. Cl. 321—18
9 Claims

ABSTRACT OF THE DISCLOSURE

A converter includes a first SCR series-coupled between input and output lines, and a second SCR connected principally to assist in commutating the first. A filter, including a choke and a capacitor, is connected to the output lines. A control unit is connected to apply turn-on signals sequentially to the first and second SCR's, and a commutating unit is connected to assist in shut-off of one SCR after the other has been gated on. Spillover diodes are connected between the inverters and the input lines to pass energy backward through the converter when the level of the energy at the output side of the converter exceeds the load requirements. The control unit includes an adjusting means for pre-setting the level of the output voltage to be passed from the converter through the filter to the load, and the control unit is connected to receive a first input signal denoting the voltage level at the output side of the filter; a second input signal denoting the current level at the output side of the converter; and a third input signal denoting the voltage level of the input energy supplied to the converter.

BACKGROUND OF THE INVENTION

The present invention is directed to a converter circuit for effecting D.C. to D.C. energy translation and providing an output voltage, in the range between zero volts and the level of the supply voltage, which is continuously variable over the range of the supply voltage.

In the d-c (direct current) power supply art there has been continual improvement of the converters or "choppers" which function as switches to transfer at least part of a supply voltage, which may be obtained from a battery, alternator, or other source, to a load circuit. The chopper approach generally includes a switch coupled in series between the supply voltage and the load, so that the amount of energy transferred, and thus the average level of the voltage applied to the load, can be regulated by controlling the opening and closing of such switch. With the advent of semiconductor switches such as the silicon-controlled rectifier, the switching is readily effected and a large power capability is also present in these switches. There has remained however the search for the "D.C. to D.C. transformer," a misnomer sometimes applied to emphasize that there has not been significant progress toward that idealized converter which not only would effect precise regulation of energy transfer from a supply voltage to a load, but in addition would allow energy to be returned in the opposite direction, from the load through the same converter circuit to the supply voltage. Such energy return would be desirable when the load is a motor being driven above its rated speed and functioning as a generator, providing excess energy which in prior converter arrangements could not be conserved by return through the converter to charge a battery which provides the supply voltage or for storage in a bank of capacitors if the source is other than a battery.

It is therefore a primary object of the present invention to provide a D.C. to D.C. converter arrangement which, when excess energy is produced on the output or load conductors, can return this excess energy directly through the converter for storage or battery recharging.

It is another important object of the present invention to provide a converter circuit operable between no load and full load to provide between zero and 100% of the supply voltage to the load in a smooth and continuously variable manner.

Summary of the invention

In accordance with the present invention, a converter circuit is provided and connected to receive D.C. energy over an input conductor and a common conductor. A commutating choke is provided, which choke includes a center tap connection and a pair of end connections. A first semiconductor switch, such as an SCR or other suitable unit, is connected directly to the input conductor and is also coupled to one of the end connections on the commutating choke. A first diode is coupled to the common conductor, and a second semiconductor switch is coupled between the other end connection of the commutating choke and the first diode. A filter or filter section, which may comprise an inductor and a capacitor, is coupled between the center tap connection of the commutating choke and the output conductor, and the filter is also coupled to the common conductor. A pair of unidirectional current conduction means, such as diodes, are coupled in series in the same sense between the input conductor and the common conductor, and the common connection between these two unidirectional current conduction means is coupled to the center tap connection of the commutating choke, to facilitate the transfer of energy fed back from the load through the converter to the input and common conductors. A control unit is connected to apply gating signals to the first and second semiconductor switches, to control the time of conduction of the first switch and thereby regulate the average amplitude of the output voltage transferred over the output and common conductors.

The drawings

Like reference numerals identify like elements in the several figures of the accompanying drawings, in which:
FIGURE 1 is a schematic diagram, partly in block form, depicting a converter circuit constructed in accordance with the inventive principles;
FIGURES 2A–5B are graphical representations useful in understanding the operation of the invention; and
FIGURE 6 is a schematic diagram, partly in block form, illustrating a preferred embodiment of the present invention.

DETAILED DESCRIPTION OF THE INVENTION

*General converter arrangement: FIGURE 1*

FIGURE 1 depicts a converter circuit in which D.C. energy received over an input conductor 10 and a common conductor 11 is transformed, by regulating the time of conduction of semiconductor switch 12 in accordance with gating signals received from a control unit 13, thus regulating the average voltage amplitude passed from filter 14 over output conductor 15 and common conductor 11 to a load 16.

In more detail any suitable source such as a battery, alternator (not shown), or other unit can be utilized to apply a unidirectional energizing potential to the input terminals 17, 18. When switch 20 is closed, the same unidirectional potential is applied between input conductor 10 and common conductor 11.

A series circuit between conductors 10, 11 is completed by first semiconductor switch 12, commutating choke 23 and a second semiconductor switch 30. Choke 23 includes a first end connection 24, a first winding portion 25, a center tap connection 26, a second winding portion 27, and a second end connection 28. Each of the semiconductor switches may be a silicon-controlled-rectifier (SCR) or other suitable switch having elements analogous to the anode, cathode and gate or control elements of an SCR.

Common conductor 31 is connected to the center tap connection 26 of commutating choke 23, and over conductor 38 to one connection of a commutating unit 36, which is also coupled over conductors 37, 39 to input conductor 10 and common conductor 11, respectively. Filter 14 is connected to receive pulsating unidirectional energy over conductors 31, 11, and to pass a relatively constant voltage over conductors 15, 11 to load 16.

It is noted that various commutating units, such as capacitors 32, 33 (FIGURE 6), could be employed to provide the appropriate level of energy for "dumping" into the adjacent winding of commutating choke 23 as the associated SCR is gated on. Alternatively an independent power supply could be provided and regulated to apply a commutating pulse between conductors 10, 31 when SCR 12 is gated on, and between conductors 31, 11 when SCR 30 is gated on. Thus the precise form of the commutating unit 36 is not significant to the arrangement and operation of the invention.

General converter operation

After a suitable D.C. energizing potential difference is applied between input terminals 17, 18, switch 20 is closed to transfer the same potential difference to conductors 10, 11. In accordance with the present invention, control unit 13 is adjusted to apply gating signals over conductors 34, 35 to control the conduction time of SCR 12. Assuming that SCR 12 is gated on as the system is energized at some reference time by application of a gating pulse over conductor 34 to the gate of SCR 12, current flows from terminal 17 over switch 20, SCR 12, winding 25 of the commutating choke, conductor 31, filter section 14 and output conductor 15 to load 16, and over common conductor 11 back to terminal 18. In accordance with the setting of adjustment knob 13A on unit 13, at a subsequent time a gating pulse is applied over conductor 35 to the gate of SCR 30 to switch this SCR on and turn off SCR 12 in a well known manner. Briefly a pulse of commutating energy is applied over conductors 38, 39 to winding 27 of the commutating choke and SCR 30, and with the transformer action of commutating choke 23, the requisite hold-off voltage is applied across SCR 12 to turn off this SCR and hold it off for the time interval required so that only SCR 30 remains conducting. It is important to note that SCR 30 does not handle any portion of the load current but in the circuit of the present invention is only utilized in switching off the energy transfer SCR 12. The result of this control of SCR 12 conduction will be described in connection with FIGURES 2A-5B.

The precise circuit configuration within control unit 13 is not important, for many circuits have been developed and utilized to provide a first gating pulse over conductor 34 and thereafter a second gating pulse over conductor 35 after the elapse of a delay time determined by the setting of knob 13A. For example a multivibrator circuit having two stable states can be employed, in which the multivibrator is always set to the first state at the beginning of each reference time period by a pulse from a reference oscillator, and is thereafter set to the second state after a time delay determined by knob 13A. By way of example the knob can control the effective value of a resistor coupled in series with a capacitor in a charging circuit to regulate the time required for the capacitor to charge to a certain voltage which in turn can be utilized to regulate the multivibrator operation.

Assuming initially that knob 13A is adjusted to govern the converter system in providing an output voltage to load 16 which is approximately ⅜ of an input voltage E applied between terminals 17, 18, then a first gating pulse is passed over conductor 34 to turn SCR 12 on at time O. As shown in FIGURE 2A, SCR 12 remains on for approximately ⅜ of the reference time period between O and T. At time t1 a gating pulse is applied over conductor 35 to switch on SCR 30 and turn off SCR 12. Accordingly there is no energy transferred from the input terminals 17, 18 to the filter section 14 between times t1 and T in FIGURE 2A.

However by reason of the connection of filter 14 between the switching components of the converter and the load 16, a substantially constant output voltage is passed to the load 16 between the times O and T as shown in FIGURE 2B. It is assumed that the drawing includes a first cycle or one complete period of operation so that the output voltage commences from zero, but thereafter remains at approximately ⅜ of input voltage E. The characteristics of the components within filter 14 tend to maintain current flowing between times t1 and T from the filter to the load. It will be shown in connection with FIGURE 6 that none of the load current, which includes the current flowing through load 16 after SCR 12 is shut off, flows through SCR 30.

If the setting of control unit 13 is modified by adjusting knob 13A to provide an output voltage approximately ³⁄₁₆ that of the input voltage E, the conduction time of SCR 12 is reduced as shown in FIGURE 3A and the average output voltage is correspondingly reduced as shown in FIGURE 3B. FIGURES 4A, 4B illustrate the operation when an output voltage approximately ¾ of the input voltage applied to terminals 17, 18 is produced, and FIGURES 5A, 5B show the corresponding operation of SCR 12 and the average output voltage when a 50% value of the input voltage is provided.

Preferred embodiment of the invention: FIGURE 6

FIGURE 6 depicts a preferred embodiment of the present invention. As there shown a battery 40 is coupled to input terminals 17, 18 so that when switch 20 is closed the potential difference supplied by the battery is applied over switch 20 and fuse 41 to input conductors 10, 10A. Coupled in series between these conductors is a resistor 42 and a Zener diode 43, and also coupled between conductors 10, 10A is an input filter capacitor 44. Spillover diodes 21, 22 are coupled in series between conductors 10, 10A as shown to provide current conduction means to transfer energy fed back from the load through the converter to input conductors 10, 10A.

In addition to the spillover diodes 21, 22, energy return diodes 45, 46 are coupled in series between the input conductors as shown. To assist in the energy return during the commutation interval and when the load is actually providing energy in excess of that passed from the battery toward the load, a spillover transformer 47 is connected to common conductor 31. The spillover transformer, illustrated as an autotransformer, includes a primary winding 48 and a secondary winding 50. Primary winding 48 is coupled between center tap connection 26 of the commutating choke and the common connection between diodes 21, 22, and winding 50 is coupled between that common connection and the common connection between diodes 45, 46. A filter capacitor 51 is parallel coupled with secondary winding 50.

A transient suppression circuit for SCR 12 includes a capacitor 52 coupled to conductor 10, and a resistor 53 coupled between the other plate of capacitor 52 and the cathode 12c of SCR 12. A similar circuit including a capacitor 54 and resistor 55 is coupled between anode 30a of SCR 30 and the other input conductor 10A. A first commutating capacitor 32 is coupled between conductors 10 and 31, and a second commutating capacitor 33 is coupled between conductors 31 and 10A.

Of considerable importance and utility in the circuit of FIGURE 6 is a diode 56, shown coupled between cathode 30c of the turn-off SCR 30 and input conductor 10A. It is noted that by reason of its connection commutating capacitor 33 cannot discharge into load 16 during the commutation interval; thus no load current flows through capacitor 33 to subtract any of the accumulated charge from this capacitor.

Control unit 57 with its adjustment knob 57A is similar in its output circuitry to control unit 13 shown in FIGURE 1. That is, a first timing signal is supplied over a cable 34 and over conductors 58, 60 to the gate-cathode circuit of SCR 12 to switch this semiconductor unit on. At a later time a gating pulse is issued over cable 35 and conductors 61, 62, which pulse is applied between the gate and cathode of the SCR 30 to switch this unit on and turn off semiconductor switch 12. However control unit 57 differs from unit 13 in that three separate input signals are also applied to control unit 57 to regulate, in conjunction with the desired setting effected by adjustment of knob 57A, the issuance of the gating pulses over the cables 34, 35.

The voltage applied to output conductors 15, 15A is sensed at conductors 63, 64 and transferred over cable 65 to the input side of control unit 57. By the connection of a resistor 66 between input conductor 10A and output conductor 15A a signal is provided over conductors 67, 68 which represents the level of current flowing from the converter toward the filter, inverter 75, and motor 16; this signal is transferred over cable 70 to the input side of control unit 57. In this current-sensing arrangement, resistor 66 has a value of only a few ohms to avoid a large loss of the energy transferred toward the load. Together input conductor 10A, resistor 66 and output conductor 15A can be considered analogous to common conductor 11 shown in FIGURE 1.

A third information signal is derived from conductor 71, shown connected between resistor 42 and Zener diode 43, and conductor 72, coupled to the common connection between diodes 21 and 22. This third signal is transferred over cable 73 to control unit 57. It is evident that control unit 57 is "informed" of the level of the input voltage supplied by the battery or other source coupled to the input terminals by reason of the information signal received over cable 73. Accordingly if the supply voltage drops, control unit 57 automatically compensates by extending the duration of SCR 12 conduction in each complete time period by the appropriate amount to maintain the output voltage substantially constant at the level preset by adjustment of knob 57A. Should the load voltage tend to rise, the appropriate information signal is passed over cable 65 to control unit 57 to reduce the conduction time of SCR 12 in each complete time period and correspondingly reduce the energy passed by the converter so that, together with the increased voltage at the load, the desired constant output voltage is maintained between output conductors 15 and 15A. In the event a shorting of the load should occur, the high level of current drawn by the load through resistor 66 provides a signal over cable 70 to control unit 57 which insures that SCR 12 remains non-conducting, preventing any drain on the battery or any other power source until the fault at the load has been remedied.

The spillover transformer 47 and its connection in the inverter circuit to recover the energy from commutating choke 23 and return this energy to the input conductors 10, 10A without a continual recirculation through and consequent heating of the SCR 12 is now well known in this art and needs no exposition here.

In addition to the retention of charge in commutating capacitor 33 effected by the connection of diode 56 noted above, capacitor 33 can charge to a voltage which is equal to the energizing voltage applied between the input conductors 10, 10A plus twice the "spillover" voltage (the voltage applied across one winding of the commutating choke as the associated commutating capacitor "dumps" into the choke). With this higher voltage and retention of the charge during the commutating interval the efficiency of commutation is enhanced and the illustrated converter circuit is capable of passing more load current by reason of the inclusion of diode 56.

As noted previously, after SCR 12 has been switched off filter 14 tends to maintain current flowing to the load. The path for current flow extends from filter 14 over conductor 15, inverter 75 (which energizes the load), conductor 15A, resistor 66, conductor 10A, diode 22, winding 48, and conductor 31 to filter 14. None of this load current flows through SCR 30.

SUMMARY

By this invention there has been provided a novel and unobvious converter circuit which can operate at zero load and can also handle a regenerative load by returning energy from either an inductive load, or a motor temporarily run as a generator, back through the converter to the input circuit.

This is an important advantage because, when an inverter is coupled between the output of the converter and a load, and the frequency of the inverter output energy is rapidly reduced to abruptly reduce the motor speed, the motor temporarily becomes a generator and pumps back a large amount of energy into the D.C bus of the inverter. Because of the present converter arrangement all this energy is returned through the converter to the input capacitor 44, where this energy can be used to recharge battery 40 or otherwise reclaimed if another source is utilized. If a D.C. motor were connected as the load and energized directly from the energy sink without an intermediate converter, the same recovery of the regenerative energy would be effected as the D.C. motor is driven to become a generator during braking or other rapid speed change conditions.

While particular embodiments of the invention have been shown and described, it will be apparent to those skilled in the art that various changes and modifications may be made therein without departing from the invention in its broader aspects. Therefore the aim in the appended claims is to cover all such changes and modifications as may fall within the true spirit and scope of the invention.

What is claimed is:

1. A converter circuit for receiving D.C. energy over a pair of input conductors and regulating the amplitude of the D.C. voltage transferred over a pair of output conductors to a load, comprising:

a commutating choke having a center tap connection and a pair of end connections, a first semiconductor switch, connected directly to one of said input conductors and also coupled to one of said end connections of the commutating choke, a first diode, coupled to the other of said input conductors, a second semiconductor switch, coupled between said first diode and the other of said end connections of said commutating choke, a filter, including an inductor coupled between said center tap connection of the commutating choke and one of said output conductors, and a capacitor coupled between said one output conductor and the other of said output conductors, second and third diodes, coupled in series in the same sense between said input conductors, and means for intercoupling said center tap connection of the commutating choke with the common connection between said second and third diodes to transfer energy fed back from the load through the converter to said input conductors, and a control unit for applying gating signals to said first and second semiconductor switches to control the time of conduction of said first switch and thereby regulate the average amplitude of the output voltage transferred over said output conductors to the load.

2. A converter circuit as set forth in claim 1, including a commutating unit coupled to said first and second semiconductor switches, for assisting in turn-off of said switches.

3. A converter circuit as set forth in claim 2, in which said commutating unit includes a first commutating capacitor, coupled between said one input conductor and said center tap connection of the commutating choke, and a second commutating capacitor, coupled between said center tap connection of the commutating choke and the common connection between the second semiconductor switch and the first diode.

4. A converter circuit as set forth in claim 1 and including an inverter, coupled between said filter and the load, for translating D.C. energy received from the filter into A.C. energy for energizing the load.

5. A converter circuit as set forth in claim 1 including an energy return circuit comprising said second and third diodes, fourth and fifth diodes coupled in series between said input conductors in the same sense as said second and third diodes, and a transformer, having a primary winding coupled between said center tap connection of the commutating choke and the common connection between said second and third diodes, and a secondary winding coupled between the common connection of said second and third diodes and the common connection of said fourth and fifth diodes, thus to pass energy returned from said output conductors through the converter to said input conductors.

6. A converter circuit as claimed in claim 1 in which said control unit includes adjusting means for regulating the first semiconductor switch on time as a percentage of a complete period of operation of the converter system.

7. A converter circuit as claimed in claim 5, further including means for applying to said control unit a signal related to the amplitude of the voltage passed from said filter over said output conductors, to regulate the average amplitude of the output voltage in accordance with both the setting of said adjusting means and the signal indicating the level of the voltage passed over said output conductors.

8. A converter circuit as claimed in claim 6, further including means for applying to said control unit a signal related to the amplitude of the voltage received over said input conductors, to regulate the average amplitude of the output voltage in accordance with both the setting of said adjusting means and the signal indicating the level of the input voltage.

9. A converter circuit as claimed in claim 6, further including means for applying to said control unit a signal related to the amplitude of the load current passed from said converter toward the load, to regulate the average amplitude of the output voltage in accordance with both the setting of said adjusting means and the signal indicating the level of the load current.

References Cited

UNITED STATES PATENTS

| 3,237,081 | 2/1966 | Martin | 321—45 XR |
| 3,250,978 | 5/1966 | Moscardi | 323—22 XR |
| 3,349,315 | 10/1967 | Studtmann | 321—45 |
| 3,353,085 | 11/1967 | Morgan | 321—43 |
| 3,355,654 | 11/1967 | Risberg | 321—44 |

JOHN F. COUCH, *Primary Examiner.*

W. M. SHOOP, JR., *Assistant Examiner.*

U.S. Cl. X.R.

321—43